(12) United States Patent
Suzuki et al.

(10) Patent No.: US 12,451,565 B2
(45) Date of Patent: Oct. 21, 2025

(54) BATTERY ASSEMBLY AND METHOD OF MANUFACTURING THE SAME

(71) Applicants: TOYOTA JIDOSHA KABUSHIKI KAISHA, Toyota (JP); PRIME PLANET ENERGY & SOLUTIONS, INC., Tokyo (JP)

(72) Inventors: Kentaro Suzuki, Kariya (JP); Koshiro Yoneda, Ichinomiya (JP)

(73) Assignees: TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 591 days.

(21) Appl. No.: 17/854,757

(22) Filed: Jun. 30, 2022

(65) Prior Publication Data

US 2023/0054644 A1    Feb. 23, 2023

(30) Foreign Application Priority Data

Aug. 18, 2021    (JP) .................................. 2021-133399

(51) Int. Cl.
*H01M 50/505*    (2021.01)
*B23K 11/00*    (2006.01)
(Continued)

(52) U.S. Cl.
CPC ......... *H01M 50/505* (2021.01); *B23K 11/002* (2013.01); *B23K 20/10* (2013.01);
(Continued)

(58) Field of Classification Search
CPC ............. H01M 50/505; H01M 50/516; H01M 50/553; H01M 50/562; H01M 50/566;
(Continued)

(56) References Cited

U.S. PATENT DOCUMENTS

| 2011/0104566 A1* | 5/2011 | Byun | ................... | B23K 26/244 |
| | | | | 219/121.64 |
| 2011/0244308 A1* | 10/2011 | Byun | ................... | H01M 50/522 |
| | | | | 429/178 |

(Continued)

FOREIGN PATENT DOCUMENTS

| JP | 2016-192322 A | 11/2016 |
| JP | 2020-191230 A | 11/2020 |

(Continued)

OTHER PUBLICATIONS

WO-2012169055-A1 translation from FIT database (Year: 2025).*
WO-2013065523-A1 translation from FIT database (Year: 2025).*

*Primary Examiner* — Jeffrey T Carley
*Assistant Examiner* — Joshua D Anderson
(74) *Attorney, Agent, or Firm* — Dinsmore & Shohl LLP (57) ABSTRACT

In a battery assembly including a first battery and a second battery, the first battery includes a negative terminal, and the negative terminal has a first metal section and a second metal section formed of a metal different from the first metal section. The second metal section is joined to the top of the first metal section with the dissimilar metal joining, and the second metal section is formed with a joint surface and a recessed portion. A method of manufacturing the battery assembly includes a process of inserting a welding assist member into the recessed portion, and a process of placing a bus bar on the joint surface of the negative terminal in which the welding assist member is inserted in the recessed portion, and joining the bus bar onto the joint surface of the negative terminal by laser welding.

4 Claims, 4 Drawing Sheets

(51) Int. Cl.
  *B23K 20/10* (2006.01)
  *B23K 20/12* (2006.01)
  *B23K 26/21* (2014.01)
  *H01M 50/516* (2021.01)

(52) U.S. Cl.
  CPC ............ *B23K 20/129* (2013.01); *B23K 26/21* (2015.10); *H01M 50/516* (2021.01)

(58) Field of Classification Search
  CPC .... B23K 11/002; B23K 20/10; B23K 20/122; B23K 20/1265; B23K 20/127; B23K 20/128; B23K 20/129; B23K 20/21; B23K 20/211; B23K 20/323; B23K 2103/18
  See application file for complete search history.

(56) References Cited

U.S. PATENT DOCUMENTS

| | | | |
|---|---|---|---|
| 2014/0011074 A1* | 1/2014 | Oda | H01M 50/562 429/211 |
| 2015/0079446 A1* | 3/2015 | Byun | H01M 50/55 429/178 |
| 2015/0086867 A1* | 3/2015 | Oda | H01R 13/03 29/623.5 |
| 2015/0318519 A1* | 11/2015 | Tsutsumi | B23K 20/002 429/163 |
| 2015/0364731 A1* | 12/2015 | Yoo | H01M 50/00 429/94 |
| 2020/0091492 A1* | 3/2020 | Guen | H01M 50/15 |
| 2020/0373530 A1 | 11/2020 | Sakura | |
| 2021/0408607 A1* | 12/2021 | Saito | H01M 10/0585 |

FOREIGN PATENT DOCUMENTS

| | | | | |
|---|---|---|---|---|
| WO | WO-2012169055 A1 * | 12/2012 | ............. | H01M 2/06 |
| WO | WO-2013065523 A1 * | 5/2013 | ............. | H01M 2/22 |

\* cited by examiner

FIG. 8  FIRST COMPARATIVE EXAMPLE

FIG. 9  SECOND COMPARATIVE EXAMPLE

BATTERY ASSEMBLY AND METHOD OF MANUFACTURING THE SAME

CROSS-REFERENCE TO RELATED APPLICATION

This application claims priority to Japanese Patent Application No. 2021-133399 filed on Aug. 18, 2021, incorporated herein by reference in its entirety.

BACKGROUND

1. Technical Field

This disclosure relates to a battery assembly and a method of manufacturing the battery assembly.

2. Description of Related Art

As disclosed in Japanese Unexamined Patent Application Publication No. 2016-192322 (JP 2016-192322 A) and Japanese Unexamined Patent Application Publication No. 2020-191230 (JP 2020-191230 A), a battery assembly is formed by stacking a plurality of secondary batteries, and electrically connecting adjacent ones of the secondary batteries to each other. For example, a positive terminal and a negative terminal of the secondary batteries located adjacent to each other are electrically connected by a bus bar (a plate made of metal), and the secondary batteries are connected in series.

The positive terminal and the negative terminal may be formed of dissimilar metals, in other words, different kinds of metals. For example, the positive terminal is formed of an aluminum alloy, and the negative terminal is formed of a copper alloy.

Suppose the bus bar is formed of an aluminum alloy, for example, and the bus bar is connected by welding to the positive terminal and the negative terminal. In this case, the welding between the bus bar and the positive terminal is welding between homogeneous metals, while the welding between the bus bar and the negative terminal is welding between dissimilar metals. In the case where the dissimilar metals are welded to each other, it is more difficult to obtain connection strength, as compared with the case where the homogeneous metals are welded to each other.

SUMMARY

As a method for improving the connection strength between the bus bar and the negative terminal, it is considered to form the negative terminal from two dissimilar metals (e.g., copper alloy and aluminum alloy). For example, the lower part of the negative terminal is formed of a copper alloy, and the upper part of the negative terminal is formed of an aluminum alloy. To construct the negative terminal, the copper alloy and the aluminum alloy are joined to each other in advance. The bus bar formed of an aluminum alloy is joined to the negative terminal thus obtained (more specifically, the aluminum alloy in the negative terminal). Thus, the aluminum alloy portion in the negative terminal and the bus bar made of the aluminum alloy can be firmly joined to each other.

However, when the negative terminal is formed from two dissimilar metals (e.g., copper alloy and aluminum alloy), the negative terminal needs to be formed by properly joining the two dissimilar metals, so that it can withstand long-term use, for example. When the two dissimilar metals are joined by ultrasonic welding, resistance welding, or friction stir spot welding, for example, the thickness of the negative terminal in its welded portion is reduced, and a recessed portion is formed. The recessed portion is formed in the aluminum alloy joined to the top of the copper alloy, for example.

When the bus bar is laser-welded to the negative terminal having the recessed portion, the laser irradiation position may shift from the desired position, due to misalignment that may occur upon assembling of the components, or manufacturing tolerances that may appear in bus bars, terminals and cells. When the laser strikes the recessed portion due to misalignment, heat can easily reach a joint surface between the dissimilar metals in the negative terminal because the recessed portion has a reduced thickness. When a lot of heat is supplied to the joint surface between the dissimilar metals in the negative terminal, an intermetallic compound may be formed between the dissimilar metals, which may result in reduction of the joining strength of the joint surface between the dissimilar metals.

This disclosure provides a battery assembly configured such that a bus bar can be properly connected to a negative terminal even when the negative terminal is formed from dissimilar metals joined to each other, and a method of manufacturing the battery assembly.

A first aspect of the disclosure relates to a method of manufacturing a battery assembly including a first battery and a second battery. The first battery includes a negative terminal, and the negative terminal has a first metal section containing a first metal, and a second metal section containing a second metal that is different from the first metal. The second metal section is joined to a top of the first metal section with dissimilar metal joining, and an upper surface of the second metal section includes a joint surface and a recessed portion having a depressed shape with respect to the joint surface. The second battery includes a positive terminal electrically connected to the negative terminal via a bus bar. The method includes inserting a welding assist member into the recessed portion, placing the bus bar on the joint surface of the negative terminal in which the welding assist member is inserted in the recessed portion, and joining the bus bar onto the joint surface of the negative terminal by laser welding.

In the method of manufacturing the battery assembly, the welding assist member may contain the same metal as the second metal of the second metal section of the negative terminal.

In the method of manufacturing the battery assembly, the recessed portion may have the depressed shape with respect to the joint surface, when the second metal section is joined to the top of the first metal section with the dissimilar metal joining.

In the method of manufacturing the battery assembly, the second metal section may be joined to the top of the first metal section with the dissimilar metal joining, by friction stir spot welding, ultrasonic welding, or resistance welding.

A second aspect of the disclosure relates to a battery assembly including a first battery, a second battery, and a bus bar. The first battery includes a negative terminal, and the negative terminal has a first metal section containing a first metal, and a second metal section containing a second metal that is different from the first metal. The second metal section is joined to a top of the first metal section with dissimilar metal joining, and an upper surface of the second metal section includes a joint surface and a recessed portion having a depressed shape with respect to the joint surface. The second battery includes a positive terminal electrically connected to the negative terminal via the bus bar. A welding assist member is inserted in the recessed portion. The bus bar is placed on the joint surface of the negative terminal in which the welding assist member is inserted in the recessed portion, and the bus bar is joined onto the joint surface of the negative terminal by laser welding.

In the battery assembly, the welding assist member may contain the same metal as the second metal of the second metal section of the negative terminal.

According to this disclosure, it is possible to provide the battery assembly configured such that the bus bar can be properly connected to the negative terminal even when the negative terminal is formed from dissimilar metals joined to each other, and the method of manufacturing the battery assembly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

A battery assembly 100 and a method of manufacturing the battery assembly 100 according to one embodiment will be described with reference to the drawings. When the number of pieces, amount, material, etc. are mentioned, the scope of this disclosure is not necessarily limited to the number of pieces, amount, material, etc, thus mentioned, unless otherwise stated. The same reference signs are assigned to the same components and corresponding components, of which description may not be repeated. It is planned from the beginning to use the configurations in the embodiment in combination as appropriate. The relationships of dimensions such as length, width, thickness, and depth are changed as needed for the sake of clarity and simplicity in the drawings, and do not represent the actual dimensional relationships.

Battery Assembly 100

Figure 1:
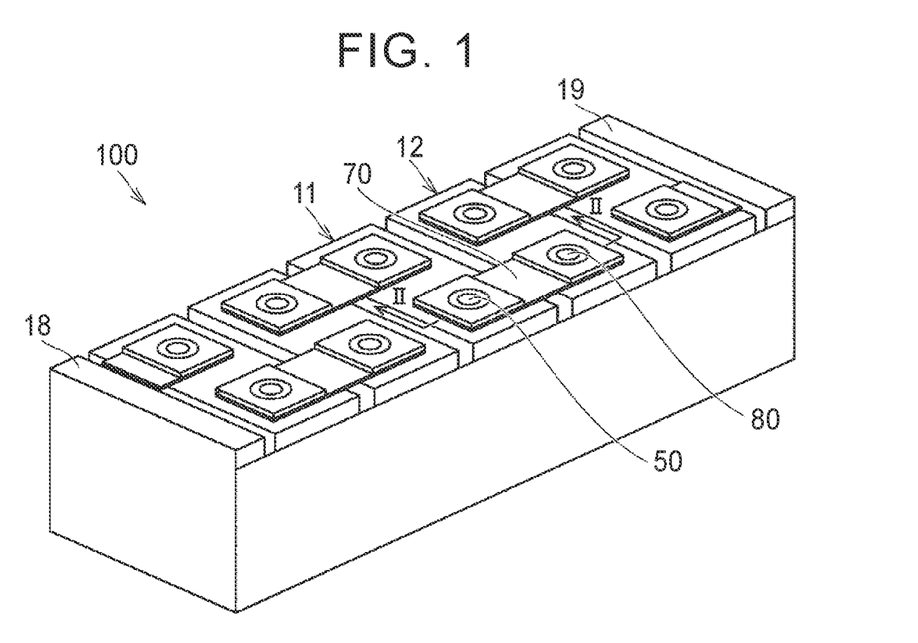
FIG. 1 is a perspective view showing a battery assembly.

FIG. 1 is a perspective view showing the battery assembly 100. The battery assembly 100 includes a secondary battery 11 as a first battery, a secondary battery 12 as a second battery, a bus bar 70, and end plates 18, 19.

In the battery assembly 100, a plurality of secondary batteries including the secondary batteries 11, 12 are stacked in one direction, and the end plates 18, 19 are respectively located at the opposite ends in the stacking direction. The stacked state is maintained by a retaining member (not shown), to form a single battery assembly 100. The secondary batteries 11, 12 are located adjacent to each other. The battery assembly 100 is installed in, for example, a hybrid electric vehicle, plug-in hybrid electric vehicle, fuel cell electric vehicle, and battery electric vehicle, and is used as a power source of these automobiles.

Each of the secondary batteries included in the battery assembly 100 is, for example, a non-aqueous electrolytic secondary battery such as a lithium-ion secondary battery. Each of the secondary batteries includes a positive terminal and a negative terminal, and the negative terminal 50 of one secondary battery 11 of the secondary batteries located adjacent to each other, and the positive terminal 80 of the other secondary battery 12 are electrically connected via the bus bar 70. The technical concept of the disclosure is not limited to the battery assembly including a plurality of non-aqueous electrolytic secondary batteries, but can be applied to a battery assembly including other secondary batteries and its manufacturing method. The use as a battery assembly is not limited to automobiles, but can be applied to various technical fields.

Secondary Battery 11

Figure 2:
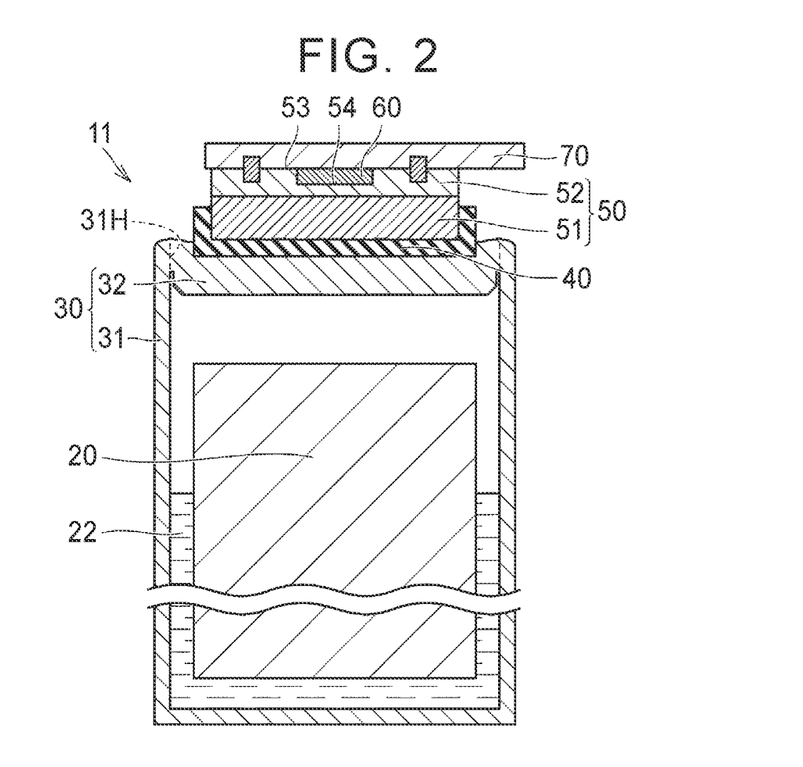
FIG. 2 is a cross-sectional view showing the internal structure of a secondary battery.

FIG. 2 is a cross-sectional view showing the internal structure of the secondary battery 11. The secondary battery 11 includes an electrode body 20, electrolyte 22, housing 30, gasket 40, negative terminal 50, positive terminal (not shown), and welding assist member 60.

The electrode body 20 is formed by stacking or winding a positive electrode, a negative electrode, and a separator, and functions as a power generating element. Inside the housing 30, the electrode body 20 is immersed in the electrolyte 22.

The housing 30 has a case member 31 and a lid member 32. The case member 31 has an opening 31H, and is formed in a rectangular shape as a whole. The electrode body 20 and the electrolyte 22 are housed inside the case member 31. The lid member 32 is shaped like a flat plate, and has an external shape (e.g., a rectangular shape) corresponding to the opening 31H of the case member 31.

The lid member 32 is joined by welding to the case member 31, to be located so as to close the opening 31H of the case member 31. FIG. 2 illustrates the state in which the lid member 32 is joined to the opening 31H of the case member 31, and the lid member 32 and the case member 31 are integrated.

The negative terminal 50 is electrically connected to the electrode body 20 located inside the case member 31, via a conducting structure (not shown). The gasket 40 is placed between the lid member 32 of the housing 30 and the negative terminal 50. The negative terminal 50 and the lid member 32 are electrically insulated by the gasket 40. The positive terminal (not shown in FIG. 2) is also electrically connected to the electrode body 20, and employs a conducting structure similar to that of the negative terminal 50, though detailed description will not be provided. The positive terminal (not shown) is formed of an aluminum alloy, for example.

The negative terminal 50 has a first metal section 51, and a second metal section 52 formed of a metal that is different from that of the first metal section 51. The first metal section 51 forms the lower part of the negative terminal 50, namely, a portion of the negative terminal 50 closer to the electrode body 20. The second metal section 52 forms the upper part of the negative terminal 50, namely, a portion of the negative terminal 50 remote from the electrode body 20.

The first metal section 51 is formed of a copper alloy, for example, and the second metal section 52 is formed of an aluminum alloy, for example. The second metal section 52 is joined to the top of the first metal section 51 with the dissimilar metal joining. The manufacturing method of the battery assembly 100 may include a process of joining the second metal section 52 to the top of the first metal section 51 with the dissimilar metal joining.

On the top face of the second metal section 52, a joint surface 53, and a recessed portion 54 having a depressed shape with respect to the joint surface 53, are formed. The recessed portion 54 is formed in the depressed shape with respect to the joint surface 53 by joining the second metal section 52 to the top of the first metal section 51 with the dissimilar metal joining, for example. This will be more specifically described below. The recessed portion 54 may have a depressed shape with respect to the joint surface 53 before performing the dissimilar metal joining.

Manufacturing Method

Figure 3:
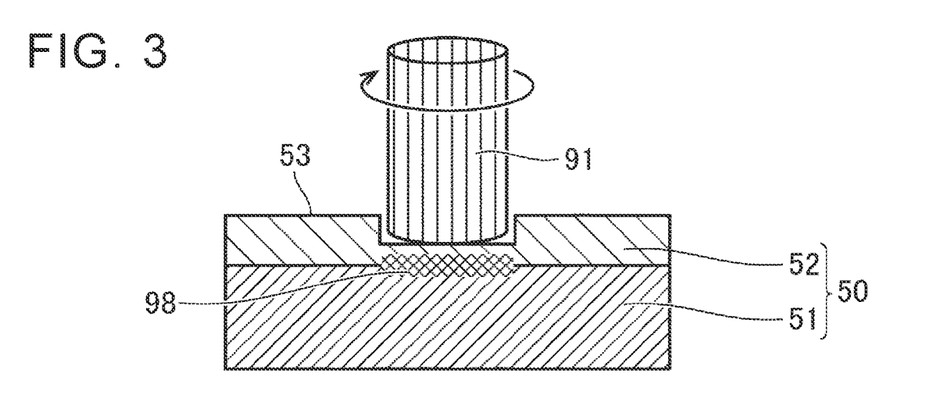
FIG. 3 is a cross-sectional view showing a manner of joining a second metal section to the top of a first metal section with the dissimilar metal joining, by a method of friction stir spot welding.

The manufacturing method of the battery assembly 100 may include a process of joining the second metal section 52 to the top of the first metal section 51 by friction stir spot welding, ultrasonic welding, or resistance welding, for example, to join dissimilar metals. FIG. 3 is a cross-sectional view showing a manner of joining the second metal section 52 to the top of the first metal section 51 with the dissimilar metal joining by a method of friction stir spot welding.

As shown in FIG. 3, in the case of friction stir spot welding, the second metal section 52 is joined to the first metal section 51 by use of a FSW stick 91 (FSW: Friction Stir Welding). In a joint surface between the second metal section 52 and the first metal section 51, an effective connecting portion 98 having a joining strength of a predetermined value or greater is formed. Before the second metal section 52 is joined to the first metal section 51, the recessed portion 54 is not formed in the joint surface 53, and the entire joint surface 53 is in the shape of a flat surface.

Figure 4:
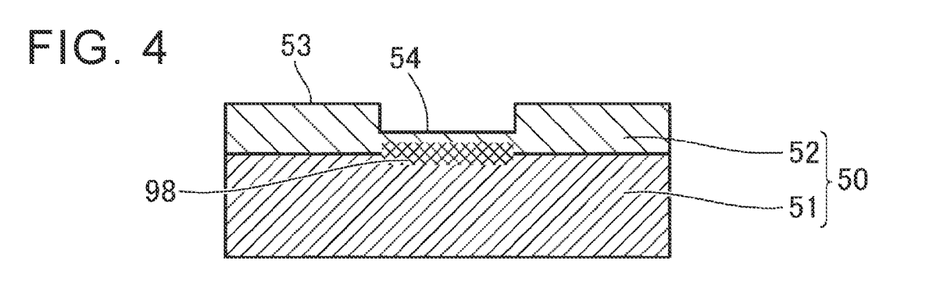
FIG. 4 is a cross-sectional view showing the state in which the second metal section is joined to the top of the first metal section with the dissimilar metal joining, by the method of friction sir spot welding.

FIG. 4 is a cross-sectional view showing the state in which the second metal section 52 is joined to the top of the first metal section 51 with the dissimilar metal joining by friction stir spot welding. By performing friction stir spot welding, the second metal section 52 is joined to the top of the first metal section 51 with the dissimilar metal joining, to form the negative terminal 50, as shown in FIG. 4. With the second metal section 52 thus joined to the top of the first metal section 51 with the dissimilar metal joining, the recessed portion 54 is formed in the depressed shape with respect to the joint surface 53.

Figure 5:
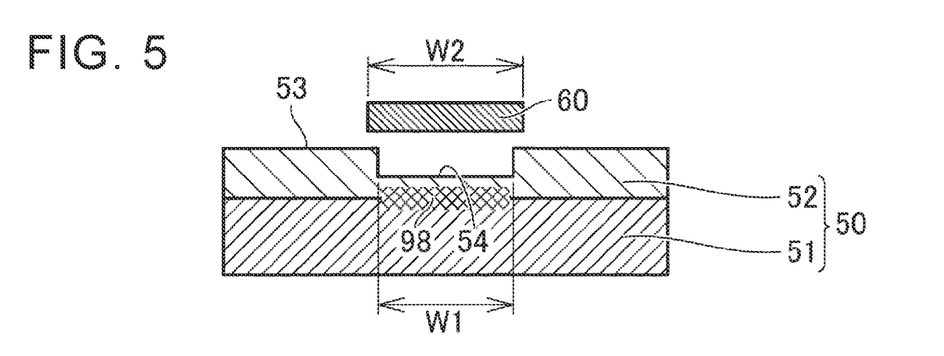
FIG. 5 is a cross-sectional view showing a manner of inserting a welding assist member into a recessed portion provided in the second metal section.
Figure 6:
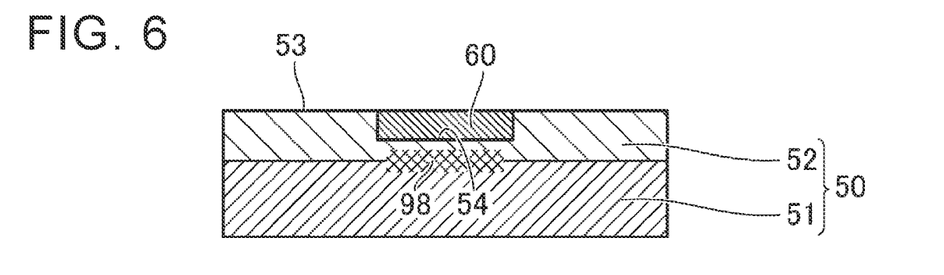
FIG. 6 is a cross-sectional view showing the state in which the welding assist member is inserted in the recessed portion provided in the second metal section.

FIG. 5 is a cross-sectional view showing a manner of inserting the welding assist member 60 into the recessed portion 54 provided in the second metal section 52. FIG. 6 is a cross-sectional view showing the state in which the welding assist member 60 is inserted in the recessed portion 54 provided in the second metal section 52. As shown in FIG. 5 and FIG. 6, the welding assist member 60 is inserted in the recessed portion 54. The manufacturing method of the battery assembly 100 includes a process of inserting the welding assist member 60 into the recessed portion 54.

The welding assist member 60 is formed of metal, for example. The welding assist member 60 is formed of the same metal as the second metal section 52 of the negative terminal 50, for example. As one example, the welding assist member 60 is formed of an aluminum alloy. The welding assist member 60 is not necessarily formed of the same metal as the second metal section 52, but may be formed from a member that melts at the same or similar melting point as that of the second metal section 52 during laser welding.

The welding assist member 60 is inserted from its own portion on the bottom side to the inside of the recessed portion 54. In some embodiments, the welding assist member 60 may have the larger width W2, diameter, or base area than the width W1, hole diameter of the recessed portion 54, or the area of the opening of the recessed portion 54. Thus, the welding assist member 60 can be firmly fixed to the inside of the recessed portion 54, by press fit or fit (tight fit).

Figure 7:
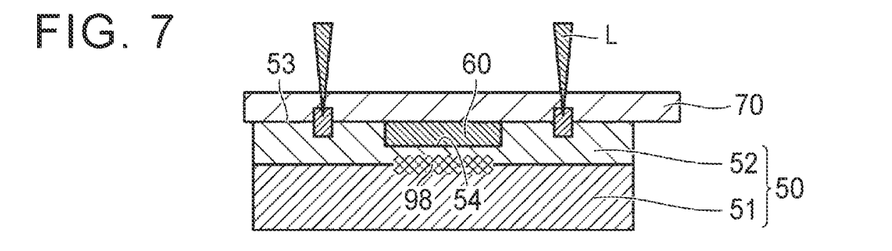
FIG. 7 is a cross-sectional view showing a manner of joining a bus bar onto a joint surface of a negative terminal (the second metal section) by laser welding.

FIG. 7 is cross-sectional view showing a manner of joining the bus bar 70 onto the joint surface 53 of the negative terminal 50 (the second metal section 52). The joint surface 53 of the second metal section 52 forms a portion of the negative terminal 50 that protrudes toward the outer side of the secondary battery 11. The bus bar 70 is electrically connected to the joint surface 53.

The manufacturing method of the battery assembly 100 includes a process of placing the bus bar 70 on the joint surface 53 of the negative terminal 50 where the welding assist member 60 is inserted in the recessed portion 54, and joining the bus bar 70 onto the joint surface 53 of the negative terminal 50, by laser welding using irradiation of laser L (FIG. 7). The bus bar 70 and the negative terminal 50 function as current-carrying pathways, and are used to take electric power stored in the electrode body 20 to the outside, and take electric power from the outside into the electrode body 20.

Operation and Effects

Figure 8:
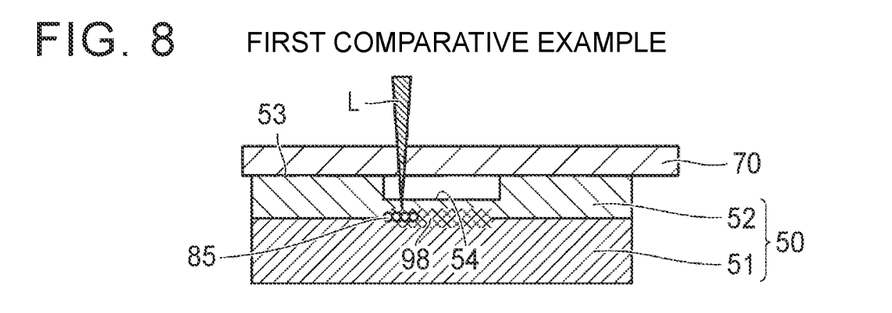
FIG. 8 is a cross-sectional view showing a manner of joining the bus bar onto the joint surface of the negative terminal (the second metal section) by laser welding, in the case of a first comparative example.
Figure 9:
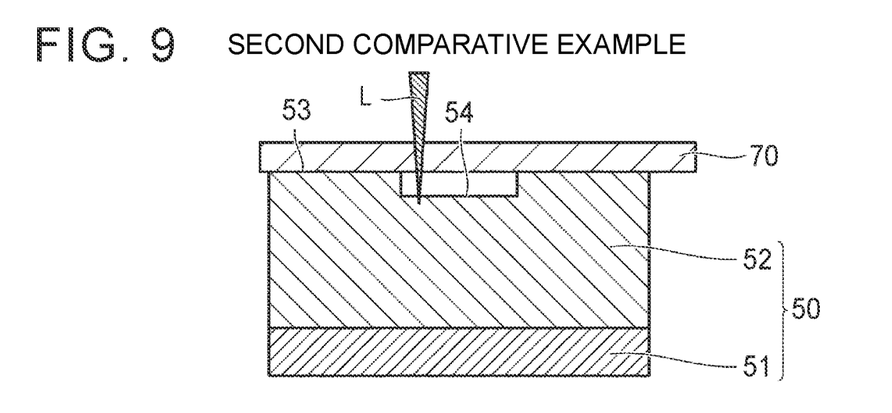
FIG. 9 is a cross-sectional view showing a manner of joining the bus bar onto the joint surface of the negative terminal (the second metal section) by laser welding, in the case of a second comparative example.

The operation and effects of this embodiment will be described in comparison with Comparative Example 1 (FIG. 8) and Comparative Example 2 (FIG. 9). FIG. 8 is a cross-sectional view showing a manner of joining the bus bar 70 onto the joint surface 53 of the negative terminal 50 (the second metal section 52) by laser welding, in the case of a first comparative example.

First Comparative Example

As shown in FIG. 8, in the case of the first comparative example, the welding assist member 60 is not inserted in the recessed portion 54. When the bus bar 70 is laser-welded to the negative terminal 50, the laser L may strike the recessed portion 54 due to misalignment in the irradiation position of the laser L (the state shown in FIG. 8). The portion of the negative terminal 50 (the second metal section 52) where the recessed portion 54 is formed has a smaller thickness than the portion of the negative terminal 50 (the second metal section 52) where the recessed portion 54 is not formed.

As stated in the beginning of this specification, heat can easily reach the joint surface between dissimilar metals in the negative terminal 50 (in other words, the effective connecting portion 98 where the first metal section 51 and the second metal section 52 are joined to each other). When a lot of heat is supplied to the joint surface between the dissimilar metals in the negative terminal 50, an intermetallic compound 85 is formed between the dissimilar metals, which may result in reduction of the joining strength of the joint surface between the dissimilar metals, in particular, the joining strength at the effective connecting portion 98. In addition, if the laser L strikes the recessed portion 54, a spark may be generated, and fume (unwanted matter) may be formed.

In contrast to the case of the first comparative example, the operation and effects (1) to (5) below, for example, can be obtained in the case of the above embodiment (see FIG. 7).

(1) Since the welding assist member 60 is present inside the recessed portion 54, the laser L hardly or never strikes the recessed portion 54 even if a misalignment arises in the irradiation position of the laser L. Consequently, no or almost no spark is generated and no or almost no fume is formed.

(2) Since the welding assist member 60 is present inside the recessed portion 54, heat is effectively prevented from reaching the joint surface between the dissimilar metals in the negative terminal 50 (in other words, the effective connecting portion 98 where the first metal section 51 and the second metal section 52 are joined to each other) even if a misalignment arises in the irradiation position of the laser L. Consequently, the intermetallic compound 85 is hardly formed between the dissimilar metals, and the joining strength at the joint surface between the dissimilar metals, in particular, the joining strength at the effective connecting portion 98, is unlikely to deteriorate.

(3) Since the welding assist member 60 is present inside the recessed portion 54, welding of the bus bar 70 itself can be performed, and/or the welding can be continued, even if the laser L strikes the welding assist member 60 due to misalignment in the irradiation position of the laser L. Thus, the welding failure rate can be reduced, and the manufacturing yield can be improved.

(4) Weld marks on the dissimilar metal working surface between the first metal section 51 and the second metal section 52 are likely to be the starting points of cracks that may be generated with age. However, in the case of the embodiment, the welding assist member 60 melts and fills the weld marks, thus making it possible to curb generation of the cracks, etc.

(5) With the recessed portion 54 filled with the welding assist member 60, moisture is less likely or unlikely to condense in the recessed portion 54 due to dew condensation, and dust is less likely or unlikely to accumulate in the recessed portion 54. As a result, the corrosion resistance of the negative terminal 50 can be improved.

In the above embodiment, the welding assist member 60 and the second metal section 52 of the negative terminal 50 are configured to melt at the same melting point, for example, the welding assist member 60 and the second metal section 52 of the negative terminal 50 are formed of the same metal, so that laser welding can be easily carried out.

Second Comparative Example

FIG. 9 is a cross-sectional view showing a manner of joining the bus bar 70 onto the joint surface 53 of the negative terminal 50 (the second metal section 52) by laser welding. In the case of the second comparative example, the second metal section 52 is formed with a larger thickness than that in the case of the first comparative example. As a result, even when the laser L strikes the recessed portion due to misalignment in the irradiation position of the laser L, heat is less likely or unlikely to reach the joint surface between the dissimilar metals in the negative terminal 50 (in other words, the portion where the first metal section 51 and the second metal section 52 are joined to each other).

In the case of the second comparative example, the intermetallic compound 85 (FIG. 8) is less likely or unlikely to be formed between the dissimilar metals, thus making it possible to curb reduction of the joining strength of the joint surface between the dissimilar metals. However, in order to join the second metal section 52 having such a large thickness to the first metal section 51, it may be required to employ a limited method, such as providing a mechanical fitting structure at the interface between the first and second metal sections 51, 52, or using a method called friction pressure welding (solid phase welding) by the action of rotation and pressure welding.

Namely, when the second metal section 52 having such a large thickness is joined to the first metal section 51, it is difficult to employ a method such as ultrasonic welding, resistance welding, or friction stir spot welding, which makes it difficult to improve the flexibility in manufacturing. Also, the entire device can become more bulky as the second metal section 52 is thicker.

In contrast to the second comparative example, in the case of the above embodiment, the second metal section 52 can be joined to the first metal section 51 by friction stir spot welding using the FSW stick 91 (FIG. 3), for example, and there is almost no restriction in terms of manufacturing. As compared with the case of the second comparative example, the entire device is unlikely to be bulky because of the thickness of the second metal section 52.

First Modified Example

Figure 10:
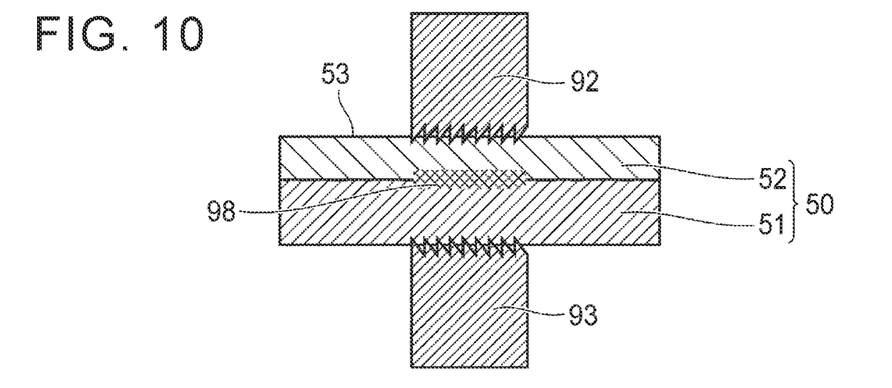
FIG. 10 is a cross-sectional view in connection with a first modified example of the embodiment, showing a manner of joining the second metal section to the top of the first metal section with the dissimilar metal joining, by a method of ultrasonic welding.

FIG. 10 is a cross-sectional view in connection with a first modified example of the embodiment, showing a manner of joining the second metal section 52 to the top of the first metal section 51 with the dissimilar metal joining by a method of ultrasonic welding. The dissimilar metal joining is not limited to the friction stir spot welding employed in the above embodiment, but the first metal section 51 may be joined to the second metal section 52 by ultrasonic welding using a horn 92 and an anvil 93. In the case where this configuration is employed, too, the recessed portion 54 (see FIG. 4) is formed, and the welding assist member 60 (see FIG. 6) is inserted in the recessed portion 54, so that the operation and effects similar to those of the above embodiment can be obtained.

Second Modified Example

Figure 11:
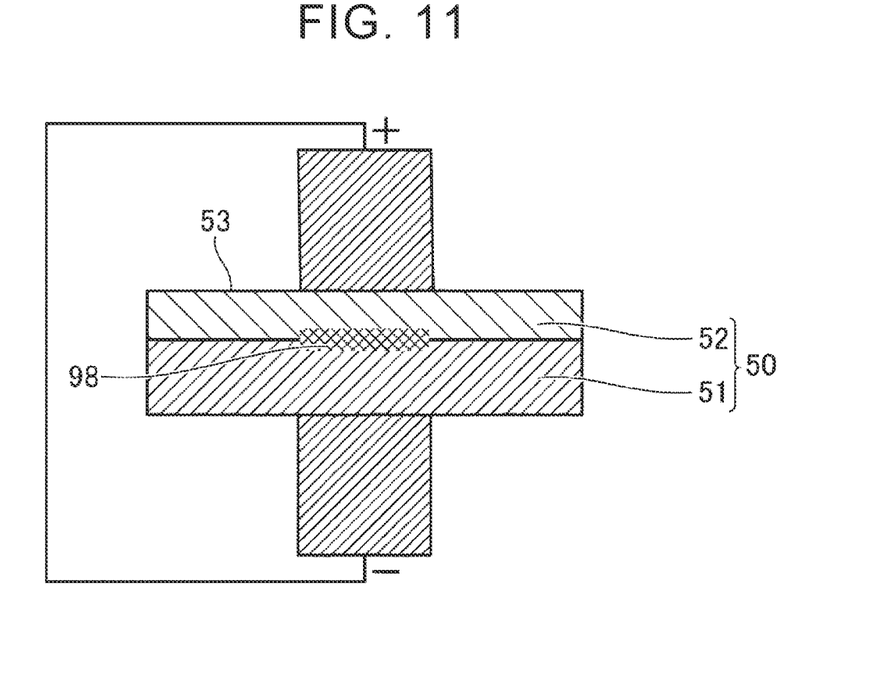
FIG. 11 is a cross-sectional view in connection with a second modified example of the embodiment, showing a manner of joining the second metal section to the top of the first metal section with the dissimilar metal joining, by a method of resistance welding.

FIG. 11 is a cross-sectional view in connection with a second modified example of the embodiment, showing a manner of joining the second metal section 52 to the top of the first metal section 51 with the dissimilar metal joining by a method of resistance welding. The dissimilar metal joining is not limited to the friction stir spot welding in the above embodiment or the ultrasonic welding in the first modified example, but the first metal section 51 may be joined to the second metal section 52 by resistance welding. In the case where this configuration is employed, too, the recessed portion 54 (see FIG. 4) is formed, and the welding assist member 60 (see FIG. 6) is inserted in the recessed portion 54, so that the operation and effects similar to those of the above embodiment can be obtained.

Third Modified Example

Figure 12:
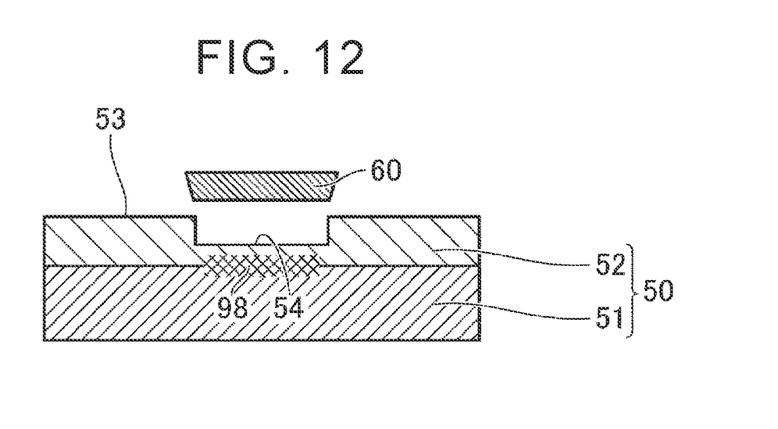
FIG. 12 is a cross-sectional view in connection with a third modified example of the embodiment, showing a manner of inserting the welding assist member into the recessed portion provided in the second metal section.

FIG. 12 is a cross-sectional view in connection with a third modified example of the embodiment, showing a manner of inserting the welding assist member 60 into the recessed portion 54 provided in the second metal section 52. The welding assist member 60 shown in FIG. 12 is also inserted from its portion on the bottom side to the inside of the recessed portion 54, as in the case of FIG. 5. The welding assist member 60 may have a tapered shape (or wedge shape) where the width is narrowed on the bottom side, with respect to the recessed portion 54. With the structure of press fit or fit (tight fit), the welding assist member 60 can be firmly fixed to the inside of the recessed portion 54.

While the embodiment based on the disclosure has been described, the content disclosed herein is illustrative and not restrictive in all respects. The technical scope of the disclosure is indicated by the claims, and is intended to include all changes or modifications within the meaning and range of equivalents to the claims.

What is claimed is:

1. A method of manufacturing a battery assembly including a first battery, a second battery, and a bus bar electrically connecting a negative terminal of the first battery to a positive terminal of the second battery, the method comprising:

providing the first battery and the second battery, the negative terminal of the first battery having a first metal section comprising a first metal, and a second metal section comprising a second metal that is different from the first metal, the second metal section being joined to a top of the first metal section with dissimilar metal joining, an upper surface of the second metal section including a joint surface and a recessed portion having a depressed shape with respect to the joint surface;

inserting a welding assist member into the recessed portion to fill the recessed portion; and placing the bus bar on the joint surface of the negative terminal in which the welding assist member is inserted in the recessed portion, and joining the bus bar onto the joint surface of the negative terminal by laser welding, and connecting the bus bar to the positive terminal of the second battery.

2. The method according to claim 1, wherein the welding assist member comprises the same metal as the second metal of the second metal section of the negative terminal.

3. The method according to claim 1, wherein the recessed portion has the depressed shape with respect to the joint surface that is formed when the second metal section is joined to the top of the first metal section with the dissimilar metal joining.

4. The method according to claim 3, wherein the second metal section is joined to the top of the first metal section with the dissimilar metal joining by friction stir spot welding, ultrasonic welding, or resistance welding.

* * * * *